United States Patent [19]

Mrazek et al.

[11] 4,437,105

[45] Mar. 13, 1984

[54] CASSETTE COMPRISING A CAPPING DEVICE AND/OR A CLEANING DEVICE FOR A PRINTING HEAD OF AN INK JET PRINTER

[75] Inventors: Gustav Mrazek; Franz Obenaus, both of Vienna, Austria

[73] Assignee: U.S. Philips Corporation, New York, N.Y.

[21] Appl. No.: 394,738

[22] Filed: Jul. 2, 1982

[30] Foreign Application Priority Data

Jul. 24, 1981 [AT] Austria ................................ 3283/81

[51] Int. Cl.$^3$ ............................................ G01D 15/18

[52] U.S. Cl. ................................................ 346/140 R

[58] Field of Search .................................... 346/140 R

[56] References Cited

U.S. PATENT DOCUMENTS

| | | | |
|---|---|---|---|
| 4,144,537 | 3/1979 | Kimura | 346/140 R |
| 4,176,363 | 11/1979 | Kasahara | 346/140 R |
| 4,177,471 | 12/1979 | Mitchell | 346/140 R |
| 4,223,322 | 9/1980 | Raamsdonk | 346/140 R |

*Primary Examiner*—Joseph W. Hartary
*Attorney, Agent, or Firm*—David R. Treacy; Robert S. Smith

[57] ABSTRACT

In a cassette comprising a capping device for the capping and/or a cleaning device for the cleaning of the jet nozzle surface (8) of a printing head (3) of an ink jet printer, the capping device defines a capping position (10) and the cleaning device defines a cleaning position (12). The positions being accessible via a window (9, 11) in a cassette wall (7). Furthermore, the cassette wall comprising the window also comprises a purging position (45) for the printing head which comprises a collecting device (46) for collecting the ink ejected during purging.

9 Claims, 8 Drawing Figures

Figure 1:
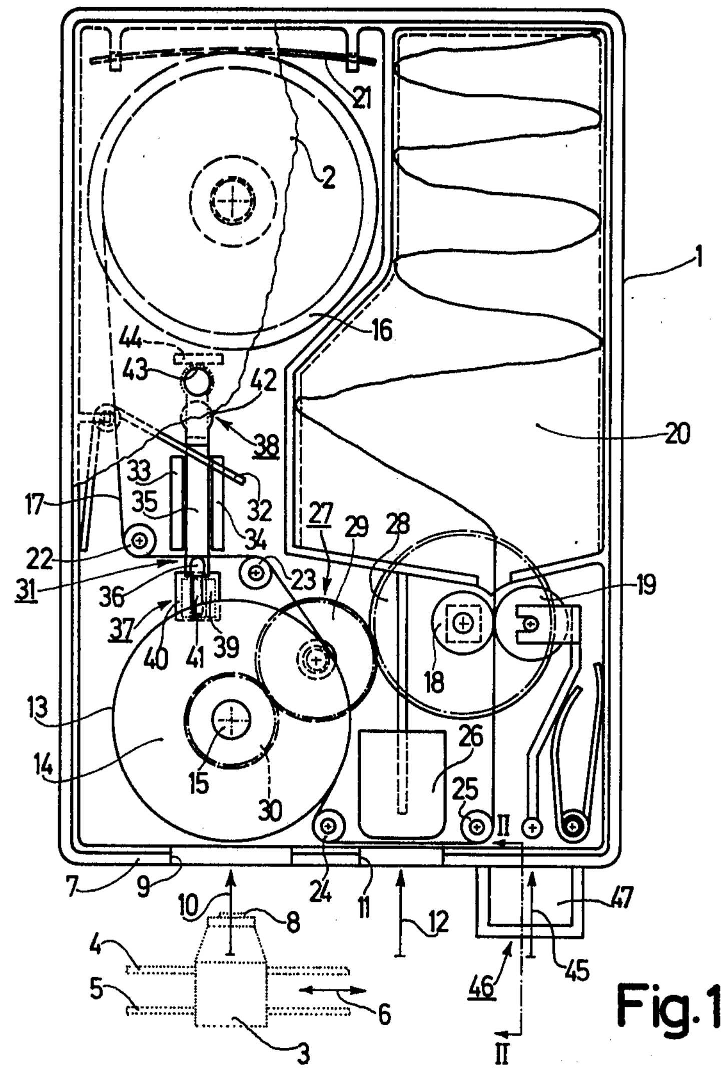

CASSETTE COMPRISING A CAPPING DEVICE AND/OR A CLEANING DEVICE FOR A PRINTING HEAD OF AN INK JET PRINTER

The invention relates to a cassette comprising a capping device for the capping and/or a cleaning device for the cleaning of the jet nozzle surface of a printing head of an ink jet printer, the capping device defining a capping position while the cleaning device defines a cleaning position, said positions being accessible through at least one window in a cassette wall. In a cassette of this kind which is known from DE-AS No. 27 56 334, the capping device comprises a drivable capping cushion having an endless surface, while the cleaning device comprises a drivable cleaning tape which can be unwound from a feed reel and which is to be wound onto a take-up reel. In the capping position, the jet nozzle surface of the printing head can be capped when the printing head is not used, so that the jet nozzles are closed; in the cleaning position, the jet nozzle surface can be brought into contact with the cleaning tape for the removal of ink residues. It has been found that such steps are very important, because the jet nozzles have a very small inner diameter so that they are susceptible to contamination or clogging by ink.

It has been found, however, that the described steps are not adequate to ensure correct operation of a printing head in all circumstances. Notably clogging of individual jet nozzles is liable to occur. In order to restore the operation of a clogged jet nozzle, it has already been proposed to purge the jet nozzles of a printing head with pressurized ink for which purpose the printing head is moved to a special position on the ink jet printer in which ink is ejected from the jet nozzles and collected in a separate reservoir in order to prevent contamination of the ink jet printer, for example, as proposed in DE-OS No. 28 27 673.

The present invention has for its object to improve a cassette of the kind set forth so that not only capping or cleaning of the jet nozzle surface of a printing head is possible, but also simple purging of the jet nozzles. To this end, the cassette in accordance with the invention is characterized in that the cassette wall comprising the window also comprises a purging position for the printing head which comprises a collecting device for collecting ink ejected from the printing head. A separate reservoir for collecting the ink ejected by the printing head during purging can thus be omitted, and also the periodic cleaning of such a reservoir. The functions which keep the jet nozzles in a good condition, such as capping, cleaning and purging are thus combined on the cassette. Thus, replacement of the cassette when the cleaning tape has been used up, also means replacement of the collecting device for the ink ejected by the printing head at the same time, so that no cleaning is necessary. A cassette of this kind has a very simple construction and offers a substantially simplified operation when used in an ink jet printer.

Within the scope of the invention there are a variety of alternatives for the construction of the collecting device. It has been found that the collecting device can be attractively formed simply by a bag-like cavity on the inner side of the cassette wall. The ink ejected from the printing head during purging collects in this bag-like cavity in which it dries up. The cavity forms a confined space so that no contamination can occur when the cassette is replaced.

It has also been found that the collecting device can be attractively formed simply by the cassette wall and a trough-shaped protrusion which projects outwards therefrom. During the purging of the printing head, the ink is ejected in the direction of the cassette wall along which the ink flows into the trough-shaped protrusion in which it is collected and dries up. The trough-shaped protrusion may be constructed to project so far that it contacts the lower side of the jet nozzle surface just below the printing head, so that any ink dripping off the jet nozzle surface after purging is also collected therein.

It has also been found to be very attractive to construct the collecting device as a self-contained unit which is formed by a trough having a projecting wall portion which extends mainly parallel to the cassette wall and which is secured in the cassette wall. The various parts of the cassette and the collecting device can thus be simply manufactured separately and the collecting device can be simply combined with the cassette when the latter is mounted.

It is also attractive to arrange the unit on the cassette so as to be displaceable against the force of a spring. For example, the unit can thus be simply displaced towards the printing head.

A particularly simple and attractive construction is characterized in that the trough is formed as an elongate slide which is displaceable perpendicularly to the cassette wall and which is accessible through a further window provided in the cassette wall. The dimensions of the trough may then be comparatively large so that a large capacity is obtained.

The collecting device preferably comprises a cushion which absorbs moisture. The ink is thus quickly absorbed in order to dry up.

A moisture absorbing cushion of this kind may be made of, for example, felt. It is very advantageous to use a moisture absorbing cushion consisting of a sintered duroplastic material. This is because it has been found that a cushion of this kind has a particularly good and high absorption capacity for ink.

The invention will be described in detail hereinafter with reference to the drawing which shows some embodiments in accordance with the invention.

Figure 2:
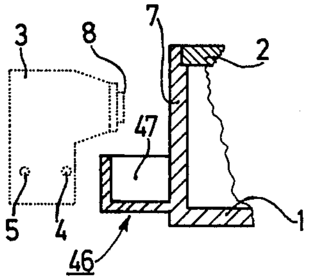
Figure 3:
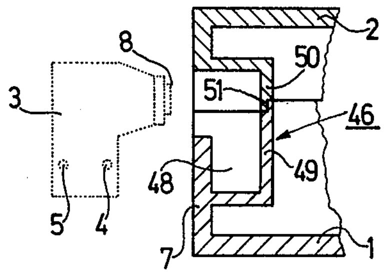
Figure 4:
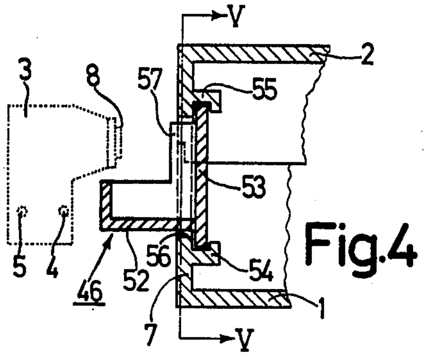
Figure 5:
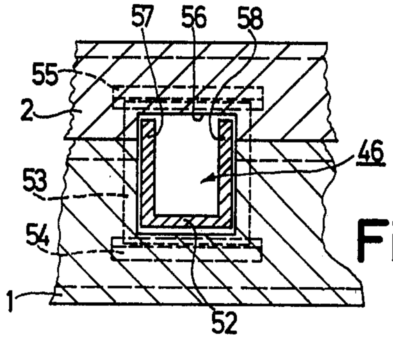
Figure 6:
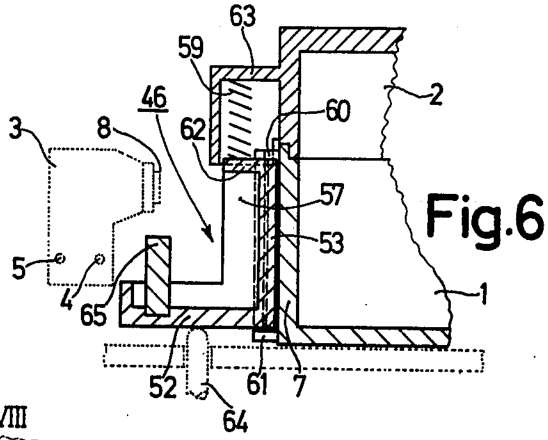
Figure 7:
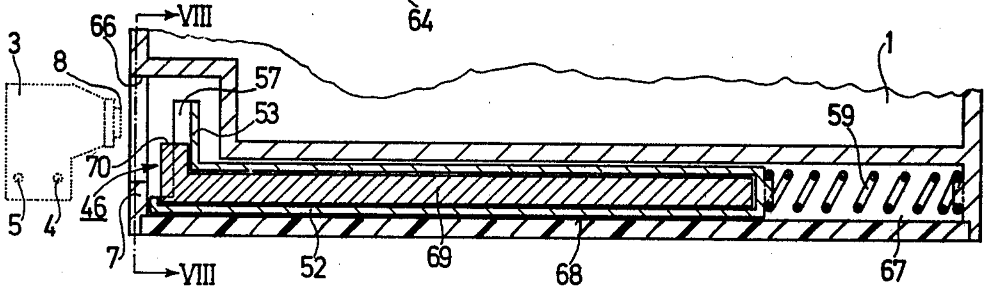
Figure 8:
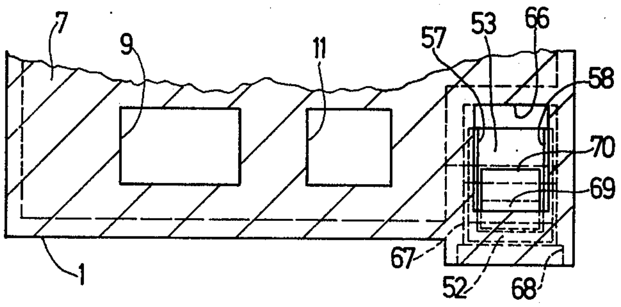

FIG. 1 is a plan view (with the largest part of the lid broken away) of a first embodiment of a cassette in accordance with the invention, FIG. 2 is a sectional view, taken along the line II—II in FIG. 1, of a detail of the cassette shown in FIG. 1, FIG. 3 shows, similarly to FIG. 2, a detail of a second embodiment of a cassette in accordance with the invention, FIG. 4 shows, similarly to FIG. 2, a detail of a third embodiment in accordance with the invention, FIG. 5 is a sectional view, taken along the line V—V in FIG. 4, of the cassette shown in FIG. 4, FIG. 6 shows, similarly to FIG. 2, a detail of a fourth embodiment, FIG. 7 is a sectional view of a detail of a fifth embodiment in accordance with the invention, and FIG. 8 is a sectional view, taken along the line VIII—VIII in FIG. 7, of the cassette shown in FIG. 7.

The reference numeral 1 in the FIGS. 1 and 2 denotes a housing section on which there is arranged a lid 2 of a cassette comprising devices for the capping and cleaning of the jet nozzle surface of a printing head of an ink jet printer. Dotted lines in these figures denote such a printing head 3 which is displaceable in the direction of the double arrow 6 on the guide rods 4 and 5. The printing head can be displaced first along the cassette wall 7, after which it enters a region beyond the cassette wall in which it can be line-wise displaced with respect to a record carrier (not shown) in order to print the desired characters thereon; for this purpose droplets of ink are ejected from jet nozzles in a jet nozzle surface 8 of the printing head 3. Because jet nozzles of this kind have a particularly small inner diameter so that they are susceptible to contamination or clogging by ink, periodic removal of ink adhering to the jet nozzle surface 8 is required; moreover, when no ink is to be ejected from the jet nozzles for a prolonged period of time, capping of the jet nozzle openings is necessary. For this purpose use is made of the present cassette which comprises a capping position which is accessible via a window 9 in a cassette wall 7 and which is denoted by an arrow 10, and a cleaning position which is accessible via a window 11 in the same cassette wall 7 and which is denoted by an arrow 12. Evidently, only one window could be provided in the cassette wall 7 for both positions. FIG. 1 shows the printing head 3 in the position opposite the capping position 10. When the jet nozzle surface 8 is to cleaned, the printing head is displaced on the guide rods 4 and 5 until it is situated in front of the window 11. The capping or cleaning of the jet nozzle surface 8 is performed by displacement of the cassette in the direction of the printing head 3 until the capping or cleaning device comes into active contact with the jet nozzle surface 8. Such a displacement of the cassette can be realized, for example, by arranging the cassette in a slide which is mounted to be displaceable on the ink jet printer.

The capping device in the cassette consists of a drivable capping cushion 14 having an endless surface 13 which is guided past the window 9 in the cassette wall 7. In the embodiment shown, the capping cushion is formed by a roller which may consist of silicon rubber in known manner. However, it would alternatively be possible to form the capping cushion as an endless band. In the present embodiment, the capping cushion 14 is mounted on a shaft 15 which itself is rotatably mounted in the housing section 1 and the lid 2. The cleaning device comprises a drivable cleaning tape 17 which can be unwound from a feed reel 16, rotatably journalled in the cassette 6, and which is transported past the window 11 in the cassette wall 7, the cleaning tape also being partly guided along the cover cushion 14 in order to remove contaminations from the surface 13 thereof. A cleaning tape of this kind may be formed in known manner as an absorbing, non-fibrous paper.

For the driving of the cleaning tape 17, the cassette comprises two rotatably journalled rollers 18 and 19 which co-operate at their circumference and wherebetween the cleaning tape is transported, it being possible to couple the roller 18 to a drive (not shown) of the ink jet printer; for this purpose it comprises a trunnion which projects from the housing section 1 and which co-operates with a shaft of the drive device. The roller 19 is spring-biassed towards the roller 18. It is also ensured that the cleaning tape 17 from the feed reel 16 is first fed partly over the surface 13 of the capping cushion 14 and subsequently to the window 11 in the cassette wall 7, thus passing the cleaning position 12, and further to the rollers 18 and 19 whereby it is transported to a storage space 20 formed in the cassette. In order to keep the cleaning tape tensioned, there is provided a brake which is formed by a leaf spring 21 and which co-operates with the feed reel 16. In order to define the path of the cleaning tape inside the cassette, a pair of guide rollers 22 and 23 is provided behind the feed reel 16, viewed in the movement direction, and behind the capping cushion 14 there is provided a pair of guide rollers 24 and 25. Between the guide rollers 24 and 25, the cleaning tape is guided along the cassette wall 7 so that it passes the window 11 therein and hence the cleaning position 12. In order to support the cleaning tape at the area of the cleaning position 12 when it is pressed against the jet nozzle surface during a cleaning operation, an elastic cushion 26 is provided on the side of the cleaning tape which is remote from the window 11.

The capping cushion 14 could be driven, for example, by means of its own drive which is independent of the drive of the cleaning tape. In this embodiment, however, the drive for the capping cushion is derived in known manner from the cleaning tape drive. To this end, there is provided a transmission 27 which acts between the roller 18 and the capping cushion 14. The transmission comprises a gearwheel 28 which is mounted on the shaft of the roller 18 and which engages an idler wheel 29 which is rotatably journalled in the cassette and which itself is in working engagement with a gearwheel 30 mounted on the shaft 15 of the capping cushion 14. The idler wheel 29 ensures that when the cleaning tape 17 is driven, the surface 13 of the capping cushion 14 is driven in the opposite direction with respect to the movement direction of the cleaning tape. This opposed movement results in very thorough cleaning of the surface 13 of the capping cushion 14 by the cleaning tape which is passed partly thereacross. Furthermore, the transmission 27 is chosen so that the surface 13 of the capping cushion is driven at a speed which exceeds that of the cleaning tape 17. It has been found that the speed of the surface 13 of the capping cushion 14 is preferably about ten times higher than the speed of the cleaning tape 17. With a comparatively small supply of cleaning tape 17, a comparatively large part of the surface 13 of the capping cushion 14 is then passed across the cleaning tape, so that the cleaning of the capping cushion is very effective, even when the cleaning tape is advanced only by a small amount for bringing fresh cleaning tape in the cleaning position.

The cassette also comprises a tape tension sensor 31 which co-operates with the cleaning tape 17. The sensor consists of, for example, a slide 35 which is arranged to be rectilinearly displaceable between two strips 33 and 34 mounted on the housing section 1 and which is subject to an expansion spring 32, said slide comprising a pin-shaped protrusion 36 which co-operates with the cleaning tape during its transport between the guide rollers 22 and 23. The tape tension sensor 31 in the present embodiment is capable of operating two signalling devices 37 and 38 as soon as the cleaning tape has been fully unwound from the feed reel 16. The signalling device 37 consists of a fork-shaped detector which comprises a light source and a photocell 39 and which is connected to the ink jet printer; the detector is denoted by dotted lines in FIG. 1 and projects into the interior of the cassette through an opening 40 in the housing section 1, the detector co-operating inside the cassette with a cam 41 on the slide 35. The other signalling device 38 consists of a visual indicator 42 which is connected to the slide 35 of the tape tension sensor 31 and which can be observed via a viewing window 43 provided in the lid 2 of the cassette.

When an operational cleaning tape 17 is present in the casette, the tape tension sensor 31 occupies the position shown in FIG. 1 in which the cam 41 is situated between the fork-shaped end of the detector 39 whilst a visual indicator 42 (for example, a coloured indicator) is situated outside the viewing window 43. Thus, the detector does not supply a signal; this may be interpreted in the ink jet printer as that the apparatus operates, because cleaning tape is present. Moreover, the user of the ink jet printer can see through the viewing window 43 that cleaning tape is indeed present. When the cleaning tape has been fully unwound from the feed reel 16, the slide 35 is displaced under the influence of the spring 32, because of the absence of tape tension, in the direction of an abutment 44 on the housing section 1, the cam 41 thus being pulled out of the detector 39 so that the visual indicator 42 is positioned in front of the viewing window 43. The detector 39 then supplies a signal which can be interpreted as an indication that the cassette must be replaced or that the apparatus no longer functions properly. Moreover, the user of the device can determine that cleaning tape is no longer present by observing the viewing window 43 in which the visual indicator 42 is visible. The provision of the tape tension sensor 31 within the cassette and the signalling device 38 in the form of a visual indicator 42 also offers the advantage that even when the cassette is not inserted in the ink jet printer, it can be determined directly on the cassette whether or not operational cleaning tape is still present in the cassette.

In order to expand the facilities of the cassette, the cassette wall 7 with the windows 9 and 11 not only comprises the capping position 10 and the cleaning position 12 but also a purging position for the printing head 3 which is denoted by an arrow 45 and which comprises a collecting device 46 for collecting ink ejected from the printing head during purging. The ejection of ink takes place with an increased pressure in comparison with the printing operation; this pressure increase is achieved, for example, by activation of a pump included in the ink circulation system of the ink jet printer. Clogged jet nozzles can thus be made operational again.

In the present embodiment, the collecting device 46 is formed simply by the cassette wall 7 and a trough-shaped protrusion 47 which projects therefrom. When the printing head 3 is in the position opposite the purging position 45 and ink is ejected therefrom at an increased pressure, the ink directly reaches the cassette wall 7 wherefrom it flows into the trough-shaped protrusion 47 in which it dries up. Because the trough-shaped protrusion extends as far as the printing head and around the jet nozzle surface, any ink dripping off the jet nozzle surface after purging also flows into the trough-shaped protrusion, so that contamination of the ink jet printer is definitely prevented. Because the purging position 45 is formed directly on the cassette, a clean purging position exists when a cassette in which the cleaning tape has been used up is replaced by a fresh cassette so that no separate cleaning operation will be necessary.

The collecting device 46 in the embodiment shown in FIG. 3 is formed by a bag-like cavity 48 on the innerside of the cassette wall 7. In order to obtain a simple construction, the bag-like cavity 48 is formed as two parts in this embodiment, a part 49 being accommodated in the housing section 1 while the second part 50 is formed in the lid 2 which has a slightly different construction in this embodiment. Thanks to the stepped parting line 51 between the housing section 1 and the lid 2, a tight passage is ensured, so that when the printing head is purged, during which ink is ejected into the bag-like cavity 48, no ink can enter the interior of the cassette. The ink again dries up in the bag-like cavity 48, the ink residues then being contained in a space which is closed or protected to a high degree, so that no contamination can occur, not even when the cassette is replaced. If desirable, the complete cassette can be transported past the printing head 3 during purging, so that the jet nozzle surface 8 projects slightly into the bag-like cavity, any ink dripping off thus also being collected in the bag-like cavity.

The collecting device 46 in the embodiment shown in the FIGS. 4 and 5 is formed as a self-contained unit which is mounted on the cassette and which comprises a trough 52 with a wall portion 53 which projects therefrom and which extends mainly parallel to the cassette wall 7. This unit is mounted at the area of the cassette wall 7 between the housing section 1 and the lid 2 of the cassette. A first hook-shaped strip 54 on the housing section 1 and a second hook-shaped strip 55 on the lid 2 engage around the ends of the wall portion 53 of the unit which is thus secured. Via an opening 56 formed in the housing section 1 and the lid 2, the trough 52 projects from the cassette as far as the printing head 3 in order to collect any ink dripping off the jet nozzle surface 8. During the purging of the printing head, the ink ejected is sprayed onto the wall portion 53 along which it flows into the trough 52 in which the ink dries up. The lateral boundaries 57 and 58 of the wall portion 53 ensure that any ink which is laterally splashed away upon landing on the wall portion 53 is also collected and guided to the trough 52, so that the cassette cannot be contaminated by ink outside the collecting device 46. Such a collecting device can be very simply manufactured and also simply mounted on the cassette.

Like in the previously described embodiment, the collecting device 46 of the embodiment shown in FIG. 6 is again formed as a unit which comprises a trough 52 with a projecting, trough-shaped wall portion 53 which extends mainly parallel to the cassette wall 7. In this embodiment, however, the unit is mounted on the cassette so as to be displaceable against the force of a spring 59. The displacement direction of the collecting device 46 is chosen so that it can be displaced with respect to the printing head 3 while gripping around the head. To this end, the collecting device 46 is arranged in a U-shaped guide 60 on the cassette wall 7 by way of the lateral, strip-like protrusions formed on the wall portion 53, the section 61 of said guide also forming an abutment for the collecting device 46 at the side of the bottom whereagainst the collecting device is pressed by the spring 59 which acts on the one side on a protrusion 62 projecting from the wall portion 53 and on the other side on a spring chamber 63 formed on the lid. For the displacement of the collecting device 46 against the force of the spring 59, a push rod 64 which is denoted by dotted lines in FIG. 6 is arranged to be displaceable on the ink jet printer. The push rod 64 can thus move the collecting device 46 towards and away from the printing head 3.

In this embodiment it is assumed that the purging of the printing head is performed in the position of the collecting device 46 which is shown in FIG. 6 and in which the collecting device rests against the abutment 61. The ejected ink again lands on the wall portion 53 of the collecting device 46 and flows into the trough 52 in which the ink dries up. As appears from FIG. 6, the collecting device 46 also comprises a scraper 65 which is formed by a strip having a smooth surface. This strip is secured in the trough 52 at one end, for example, in that it is arranged in a groove formed therein, the other end of said strip projecting from the trough. The strip terminates underneath the jet nozzle surface 8 of the printing head 3 when the collecting device 46 rests against the abutment 61. A strip of this kind may be simply made of a plastics material. When the collecting device 46 is displaced in the direction of the printing head 3 by means of the push rod 64 after the purging of the printing head 3, the scraper 65 slides across the jet nozzle surface 8 of the printing head 3, the free end of the scraper 65 also being slightly flexible. Any ink adhering to the printing head at this area is thus transport to the trough 52 by way of the scraper. As is known, a smooth surface transported along a droplet separates the droplet which is thus carried off. Because the scraper does not directly contact the jet nozzle surface, damaging of this surface is prevented.

The inclusion of such a scraper in a collecting device, however, is not restricted to a displaceable collecting device. For example, the collecting device 46 of the embodiment shown in the FIGS. 4 and 5 could also comprise a scraper. Various possibilites exist as regards the slidable guiding of such a scraper along the jet nozzle surface of the printing head. For example, the cassette may be displaced so that the free end of the scraper moves along the jet nozzle surface of the printing head. However, the scraper could alternatively be arranged slightly to the side of the position occupied by the printing head with respect to the purging position on the cassette, the scraper then reaching up to the level of the printing head in its longitudinal direction. During the displacement of the printing head from its position with respect to the purging position on the cassette on the guide rods 4 and 5 after purging, it slides over the free end of the scraper, so that the latter slides along the jet nozzle surface of the printing head, any ink adhering at this area thus being transported to the trough of the collecting device via the scraper.

The collecting device 46 of the embodiment shown in the FIGS. 7 and 8 is again formed as a displaceable, self-contained unit which comprises a trough 52 with a projecting wall portion 53. In this case, however, the trough 52 is formed as an elongate slide which is displaceable perpendicularly to the cassette wall 7 against the force of a spring 59 and which is accessible through a further window 66 formed in the cassette wall 7. The unit with the spring 59 is mounted in a tubular recess 67 which is formed in the housing section 1 of the cassette and which is closed by a lid 68. The wall 7 forms an abutment for the trough 52 which is pressed thereagainst by the spring 59 as shown in FIG. 7. For the purging of the printing head 3, it is moved to a position in front of the window 66, so that it is situated opposite the purging position on the cassette. The wall portion 53 of the collecting device 46 again serves to collect the ink ejected from the printing head during purging in order to transport the ink to the trough 52.

The collecting device 46 of this embodiment comprises a mositure absorbing cushion 69 which serves to absorb and distribute the ink flowing off the wall portion 53 in order to achieve quick drying up. A cushion of this kind may be made of, for example, felt. However, the cushion preferably consists of a sintered duro plastic material, for example, polyurethane, because such a cushion has particularly good absorption properties and a high absobtion capacity for ink. As appears from FIG. 7. the moisture-absorbing cushion fills the entire trough 52 which is formed as an elongate slide, the cushion projecting from the trough at the area of the wall portion 53. To this end, the cushion is formed as an L-shaped strip which is slid entirely into the trough 52 from the front side thereof. The end 70 projecting from the trough is then situated opposite the printing head 3 at such a level that it can be positioned against the jet nozzle surface of the printing head. For such positioning of the cushion against the printing head, the complete cassette is displaced in the direction of the printing head until the cushion contacts the head and the complete collecting device 46 is displaced slightly against the force of the spring 59, so that the cushion is positioned completely and flatly against the printing head under the influence of the spring.

During the purging of the printing head 3, the cassette occupies the position opposite the printing head 3 as shown in FIG. 7. The ink ejected from the printing head during purging then lands on the wall portion 53 of the collecting device 46 after which it flows to the mositure absorbing cushion 69 in which it is absorbed and distributed, the ink subsequently drying up. After purging, the cassette is displaced in the direction of the printing head 3 until the end 70 of the cushion 69 which projects from the trough rests against the jet nozzle surface 8 of the printing head, any ink adhering to the printing at this area also being absorbed by the cushion. Subsequently, the cassette is returned to the starting position, after which the printing head is displaced to the position opposite the cleaning position on the cassette, i.e. opposite the window 11 in the cassette wall 7; the jet nozzle surface of the printing head can then be cleaned by the application of the cleaning tape. It would also be possible, of course, to bring the jet nozzle surface directly into contact with the cushion 69 after the purging of the printing head in the purging position, but it has been found that this is not attractive because the jet nozzle surface of a printing head is known to be very vulnerable and could be damaged by the rougher moisture absorbing cushion in given circumstances. Therefore, as has already been described, the cushion is preferably positioned only against the jet nozzle surface of the printing head and the jet nozzle surface itself is cleaned by means of the cleaning tape in the cleaning position in the manner described in detail for the embodiment shown in FIG. 1.

Obviously, a series of modifications of the described embodiments are feasible. In this respect it is to be noted that a moisture absorbing cushion as used in the collecting device as described for the embodiment shown in the FIGS. 7 and 8 can also be used, of course, in the collecting devices of the other embodiments, because even cushions of this kind which have smaller dimensions already exhibit suitable absorbtion properties. If desirable, the wall whereto the ink is ejected during purging may also be covered with a moisture absorging cushion. Of course, it is also possible to use a combination of a moisture absorbing cushion and a scraper of the kind described for the embodiment shown in FIG. 6. It is also possible, of course, to introduce a purging position in cassettes which comprise either only a cleaning position or only a capping position.

What is claimed is:

1. A cassette comprising a capping device for the capping and/or a cleaning device for the cleaning of the jet nozzle surface of a printing head of an ink jet printer, the capping device defining a capping position while the cleaning device defines a cleaning position, said positions being accessible through at least one window in a cassette wall, characterized in that the cassette wall (7) comprising the window (9, 11) also comprises a purging position (45) for the printing head (3) which comprises a collecting device (46) for collecting ink ejected from the printing head.

2. A cassette as claimed in claim 1, characterized in that the collecting device (46) is formed by a bag-like cavity (48) on the inner side of the cassette wall (7).

3. A cassette as claimed in claim 1, characterized in that the collecting device (46) is formed by the cassette wall (7) and a trough-shaped protrusion (47) which projects outward therefrom.

4. A cassette as claimed in claim 1, characterized in that the collecting device (46) consists of a self-contained unit which is formed by a trough (52) with a projecting wall portion (53) which extends mainly parallel to the cassette wall (7) and which is secured in the cassette.

5. A cassette as claimed in claim 4, characterized in that the unit is mounted on the cassette so as to be displaceable against the force of a spring (59).

6. A cassette as claimed in claim 5, characterized in that the trough (52) is formed as an elongate slide which is displaceable perpendicularly to the cassette wall (7) and which is accessible via a further window (66) formed in the cassette wall.

7. A cassette as claimed in any of the preceding claims, characterized in that the collecting device (46) comprises a moisture-absorbing cushion (69).

8. A cassette as claimed in claim 7, characterized in that the moisture-absorbing cushion (69) is made of a sintered duroplastic material.

9. A cassette as claimed in any of the preceding claims, characterized in that the collecting device comprises a scraper for the printing head which is formed by a strip (65) having a smooth surface and which is capable of sliding over the jet nozzle surface of the printing head (3).

* * * * *